(12) United States Patent
Voss et al.

(10) Patent No.: US 7,148,919 B2
(45) Date of Patent: Dec. 12, 2006

(54) CAPTURING A STILL IMAGE AND VIDEO IMAGE DURING A SINGLE EXPOSURE PERIOD

(75) Inventors: James S. Voss, Fort Collins, CO (US); James W. Owens, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 689 days.

(21) Appl. No.: 10/304,960

(22) Filed: Nov. 27, 2002

(65) Prior Publication Data

US 2004/0100574 A1 May 27, 2004

(51) Int. Cl.
*H04N 5/225* (2006.01)
(52) U.S. Cl. .................................. 348/220.1
(58) Field of Classification Search .............. 348/220.1
See application file for complete search history.

(56) References Cited

U.S. PATENT DOCUMENTS 6,278,490 B1 * 8/2001 Fukuda et al. .............. 348/362
6,967,686 B1 * 11/2005 Tanaka ....................... 348/352
2002/0186312 A1 * 12/2002 Stark .......................... 348/302
2002/0196348 A1 * 12/2002 Kubo ....................... 348/220.1

FOREIGN PATENT DOCUMENTS

JP 10-108121 4/1998

OTHER PUBLICATIONS

Eric R. Fossum, 1995, IEEE, "CMOS Image Sensors: Electronic Camera On A Chip", pp. 1.3.1-1.3.9.*

* cited by examiner

*Primary Examiner*—Ngoc-Yen Vu
*Assistant Examiner*—Anthony J. Daniels

(57) ABSTRACT

An imaging system operable to substantially simultaneously capture still image data and video data. The imaging system includes an optical system capturing incident light representative of an image and an integrated circuit. The integrated circuit includes at least one sensor receiving the incident light and substantially simultaneously generating the still image data and the video data within an exposure window. The imaging system also includes a controller transmitting signals to the integrated circuit for controlling the generation of the still image data and the video data.

23 Claims, 4 Drawing Sheets

US 7,148,919 B2

CAPTURING A STILL IMAGE AND VIDEO IMAGE DURING A SINGLE EXPOSURE PERIOD

BACKGROUND

Digital cameras are increasingly popular and technology advances have resulted in these cameras having the capability to capture video data as well as high resolution still images. A digital camera captures an image (e.g., a subject, scene, or view) in elemental portions and generates an electronic signal that is representative of the subject, scene, or view. Unlike conventional film cameras that use a photoresponsive film as the image capturing medium, digital cameras typically use one or more charge coupled device (CCD) integrated chips. The CCD chips are configured to receive light reflecting from the photographic subject and to convert the reflected light into a digital signal representative of the captured image.

Many of these digital cameras can operate in a first capture mode for capturing high resolution still images (e.g., typically 2.1 mega pixels or greater), and operate in a second capture mode for capturing low resolution video data (e.g., typically 0.3 mega pixels or less). Because of the two modes of operation, a user desiring to capture both video images and high resolution still images of a scene must switch modes, likely resulting in the shot being missed.

Two modes are utilized for a variety of reasons. In the second capture mode, the digital camera may be able to capture multiple still images per second (e.g., 30 frames per second), usually in a low resolution, which amounts to video data. Operating in the first capture mode, the digital camera can capture high resolution still images. Because of the high resolution, these still images cannot be processed at the rate of the video images captured in the second mode. Accordingly, different modes are used.

SUMMARY

According to an embodiment, a method for capturing video and still images comprises steps of exposing at least one sensor for a first period of time to incident light producing an image; generating video data from the exposed at least one sensor prior to the end of the first period of time wherein the video data is representative of the image; and generating still image data from the exposed at least one sensor wherein the still image data is representative of the image.

According to another embodiment, an imaging apparatus is operable to substantially simultaneously capture still image data and video data. The imaging apparatus includes an optical system capturing incident light producing an image and an integrated circuit including at least one sensor receiving the incident light and substantially simultaneously generating the still image data and the video data within an exposure window. The imaging apparatus also includes a controller transmitting signals to the integrated circuit for controlling the generation of the still image data and the video data.

According to yet another embodiment, an integrated circuit is operable to substantially simultaneously generate still image data and video data. The integrated circuit comprises at least one sensor receiving incident light during an exposure window and an exposure period within the exposure window. The at least one sensor is operable to output a first set of pixels substantially at an end of the exposure period and output a second set of pixels substantially at an end of the exposure window. A controller is operable to bin at least some of the first set of pixels, wherein the controller generates video data from the binned pixels and generates still image data from at least some of the second set of pixels.

According to yet another embodiment, an imaging apparatus comprises means for exposing at least one sensor for a first period of time to incident light producing an image; means for generating video data from the exposed at least one sensor prior to the end of the first period of time wherein the video data is representative of the image; and means for generating still image data from the exposed at least one sensor wherein the still image data is representative of the image.

DETAILED DESCRIPTION

Figure 1:
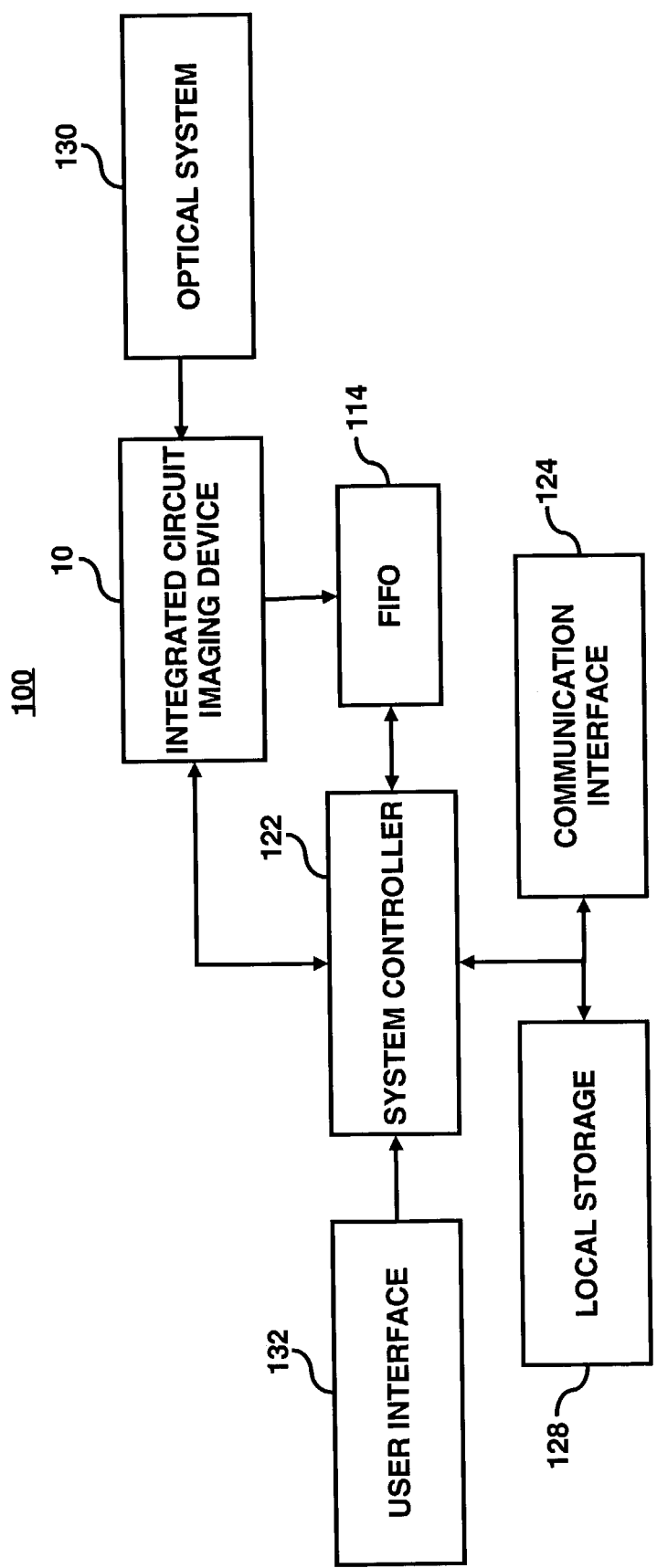
FIG. 1 illustrates an imaging system, according to an embodiment.

FIG. 1 is a block diagram of an imaging system 100, according to an embodiment. The imaging system 100 may be utilized in an imaging device, such as digital camera, camcorder or any image device that may capture, process or otherwise use multimode image data. The imaging system 100 includes an optical system 130 that channels incident light representative of an image to photo-receptive sensors on an integrated circuit 10. The sensors may include complementary metal oxide (CMOS) sensors or other sensors that are capable of nondestructive readouts.

A CCD sensor is a charge storage and transfer device. The charge represents the light intensity falling on a pixel at the instant of readout (i.e., when the charge is transferred). The charge can only be transferred from the CCD sensor one time (i.e., a destructive readout). Instead, a CMOS sensor, for example, is able to readout image data multiple times. That is, the image data can be output from the CMOS sensor and the CMOS sensor may continue to store the image data until it is reset. Therefore, a CMOS sensor array is capable of nondestructive readouts, which enables the system 100 to substantially simultaneously capture video and still images as described in detail below.

A system controller 122 may transmit timing signals to the integrated circuit 10 for controlling capture of images by the sensors on the integrated circuit 10. The system controller 122 may include one or more processors, processing circuitry, such as ASIC's, or any reasonably suitable combination thereof. A user may interact with the system controller 122 through a user interface 132.

The integrated circuit 10 generates digital image data (e.g., video and/or still images), which is output to a buffer 114. The integrated circuit 10 is capable of performing binning. As is known in the art, binning comprises summing pixels, which can lighten a dark image to improve image quality.

According to an embodiment, the system 100 is operable to simultaneously capture video data and still image data for generating a multimode stream of image data. Video data, for example, may include a stream of low resolution still images (e.g., video frames) and still image data may include still images typically having a higher resolution than the video data.

As described in co-pending U.S. patent application Ser. No. 10/304,947, herein incorporated by reference in its entirety, the system controller 122 may retrieve the multimode stream of image data from the buffer 114 (e.g., a first-in-first-out buffer) and output the multimode stream of image data to a local storage 128 and/or a communication interface 124. The system controller 122 may filter still image data from the multimode stream unless a user event, which may include shutter activation or another event, is detected. If a user event is detected, still image data retrieved from the buffer 114 may be transmitted to the local storage 128 and/or the communication interface 124. The buffer 114, for example, may store at least 3 seconds of image data from the multimode stream. The buffer size, however, can be larger or smaller depending on the requirements of the system 100. Furthermore, by using the buffer 114, still image data corresponding to a detected user event (e.g., 1.5 seconds of still image data before and after the detected user event) may be retrieved such that a user does not miss a shot. For example, the shutter is activated by the user. The system controller 122 receives 1.5 seconds of still image data before and after the shutter activation from the buffer 114. Then, the user may select a desired still image from the still image data. Therefore, still image data is stored only when desired by a user, which conserves the limited storage in the system 100, and a sufficient amount of still image data may be stored to prevent a user from missing a shot.

Transmission of the image data to an external processing system may be accomplished using the communication interface 124. For instance, as a digital camera, the system 100 may include a communication interface that implements a computer peripheral bus standard such as universal serial bus (USB) or Institute of Electronic and Electrical Engineers (IEEE) 1394 specification (1995). The local storage 128 may be of the non-volatile variety (e.g., a removable memory card, a rotating magnetic disk device, or other suitable memory device for permanent storage of digital image data).

Although not shown, the system 100 may include image processing circuitry including hardwired logic and/or a programmed processor that performs a variety of functions, including preparing digital image data based on sensor signals generated by the integrated circuit 10 for storage or transmission. Post processing may further include effects processing (e.g., fades, dissolves, overlays, etc.) and compression. Other instances of well-known structures, interfaces, and processes have not been shown in detail in order not to unnecessarily obscure the description of the embodiments.

Figure 2:
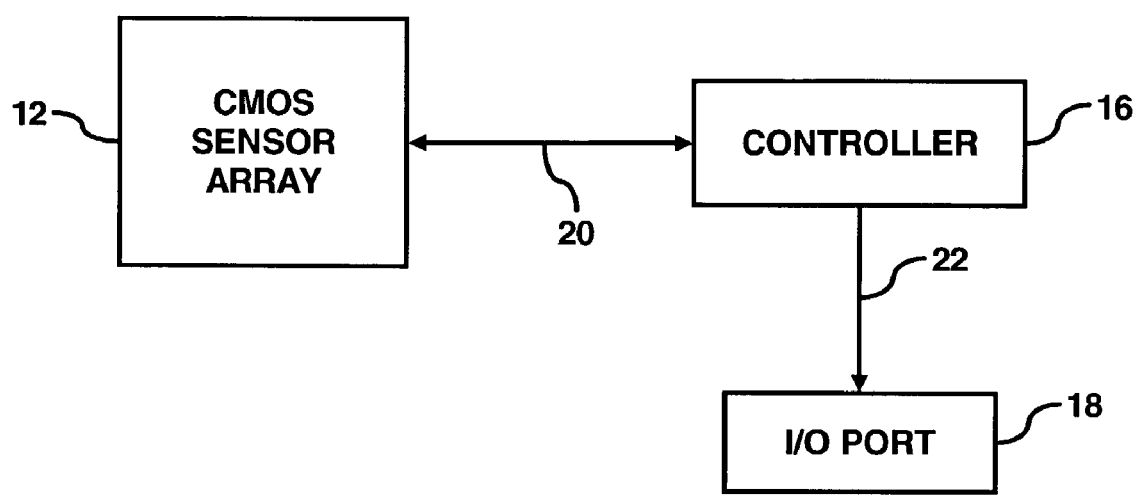
FIG. 2 illustrates the integrated circuit imaging device shown in the imaging system of FIG. 1, according to an embodiment.

According to an embodiment, FIG. 2 illustrates the integrated circuit 10 formed from a CMOS process on a chip having at least one CMOS sensor array 12, a controller unit 16 and an input/output (I/O) port 18. The sensor array 12 may include a grid of individual CMOS light sensing picture elements (not shown) sensing an amount of light intensity illuminating the sensing elements, such as from the images produced thereon by the optical system 130 of FIG. 1. The sensor array 12 is configured to output analog signals representative of the amount of light intensity on the sensing elements to the controller 16 along an analog signal connection bus 20. Depending upon the configuration, analog signals from sensor elements in the array 12 may be output simultaneously in parallel, output one at a time in series, or output row-by-row or column-by-column, etc.

The controller unit 16 includes analog-to-digital (A/D) circuitry, not shown, for converting analog signals received from the sensor array 12 to digital signals. In addition, the controller unit 16 contains circuitry for processing the received signals. The digital signals are routed along a digital bus line 22 to digital I/O port 18 for output. The controller unit 16, depending upon the configuration, can perform one of a wide variety of image processing operations including, for example, pattern recognition operations, filtering operations, Fourier transform operations, and the like. Resulting digital signals are output from circuit 10 through digital I/O port 18. Depending upon the implementation, the content and format of the digital signals output by the controller unit 16 may differ.

According to an embodiment, the integrated circuit 10 is capable of simultaneously capturing still image data and video data by performing pixel binning and using multiple exposure times. The integrated circuit 10 may include a known CMOS integrated circuit capable of performing binning. For example, FOVEON, provides a CMOS circuit with binning capability. As is known in the art, binning comprises summing pixels, which can lighten a dark image to improve image quality.

Figure 3:
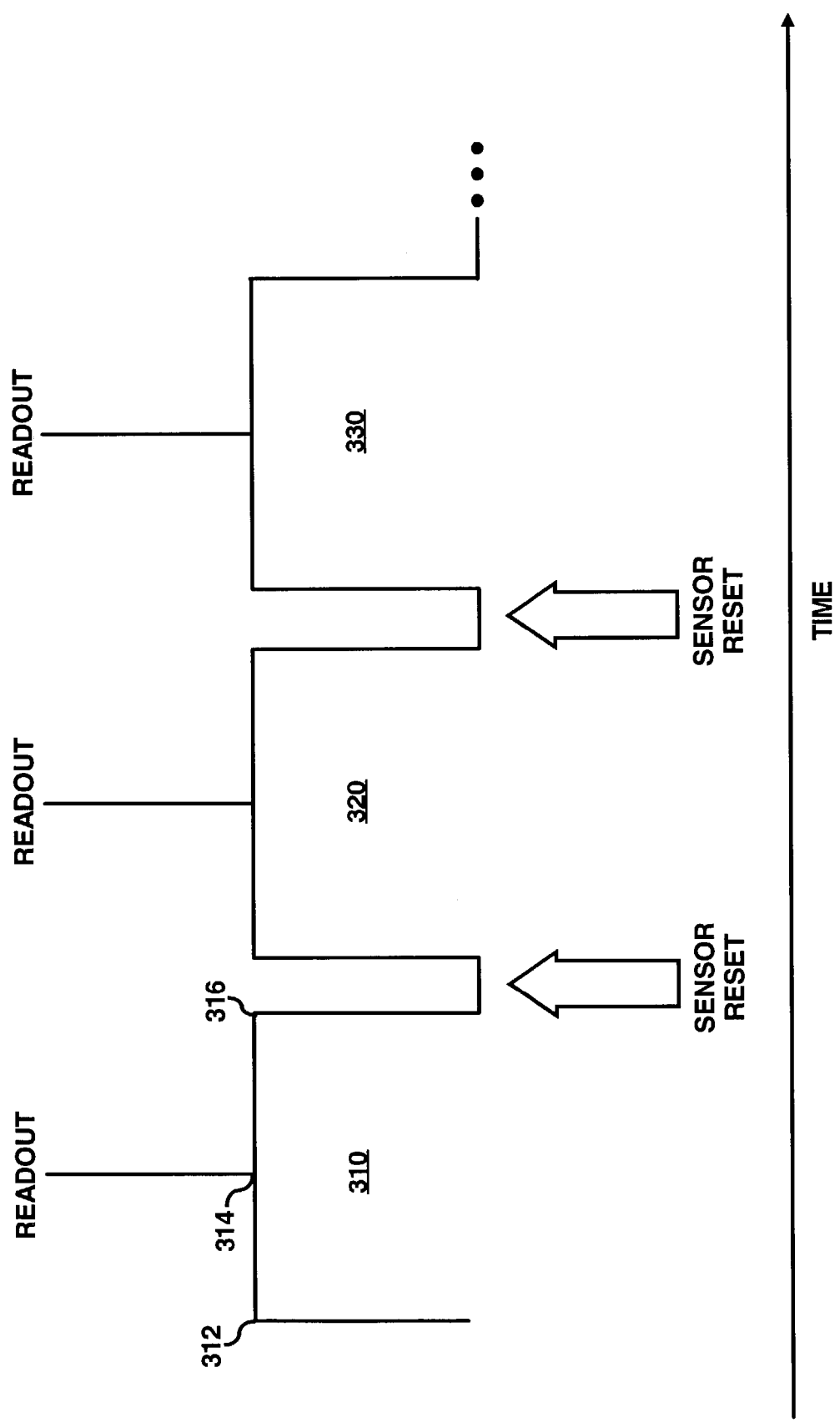
FIG. 3 illustrates multiple exposure windows, according to an embodiment.

The system 100 uses an exposure window and binning techniques for capturing high resolution still images and video substantially simultaneously. FIG. 3 illustrates multiple exposure windows 310, 320 and 330, according to an embodiment. In the exposure window 310, binning is performed by the circuit 10 (e.g., the controller 16 in the integrated circuit 10 executing firmware) from the start of the video signal frame capture 312 to the end of a predetermined, shortened, exposure time 314 (e.g., 1/90 of a second). At substantially the point 314 in the exposure window 310, a video frame is generated by the circuit 10, prior to an end 316 of the exposure window 310. A digital still image is readout at the end of the exposure window 316 (e.g., ranging from 1/24 to 1/30 of a second, inclusive). The sensor array 112 may then be reset, and video frames and still images may continue to be captured during exposure windows 320, 330, etc.

Exposure windows 320 and 330 are substantially similar to the exposure window 310. Also, if binning is not performed (e.g., when still images are not produced), then a readout is not performed prior to end of the exposure window. In addition, the integrated circuit I/O may include a device (e.g., a CMOS integrated circuit) operable to perform a nondestructive readout prior to an end of an exposure window.

Figure 4:
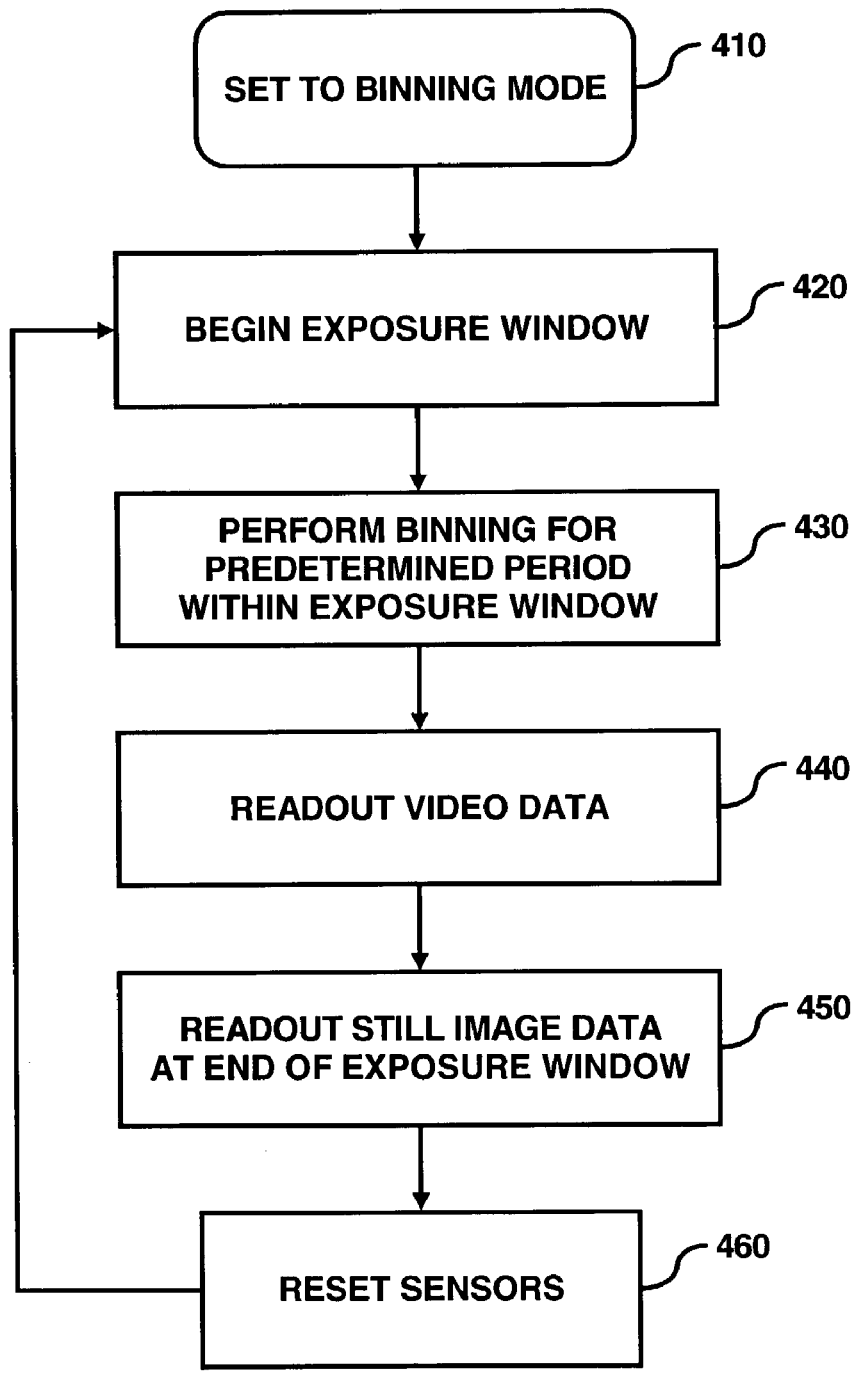
FIG. 4 illustrates a flow diagram of an exemplary method for capturing still images and video, according to an embodiment.

FIG. 4 is a flow diagram of a method 400 for simultaneously capturing video and still images according to an embodiment. In step 410, the system 100 is set to binning mode, such that the imaging device may perform binning for captured images. In step 420, the system 100 begins exposure of the circuit 10 to incident light to capture a video frame, such as when the exposure window 310 is started. This step and the step 410 may be initiated by a user.

In step 430, binning is performed on pixels (i.e., data produced by light sensing picture elements) generated by the circuit 10 for a predetermined period of time within the exposure window. In step 440, video data, such as a video frame, is output by the circuit 10 substantially at the end of the predetermined period of time. The pixels are generated, for example, by the CMOS sensor array 12 of the circuit 10 of FIG. 2.

In step 450, still image data is output by the circuit 10 substantially at the end of the exposure window. For example, binning is stopped at the end of the predetermined period of time. The CMOS sensor array 12 outputs pixels again substantially at the end of the exposure window for generating still image data. In step 460, the sensor array 12 in the circuit 10 is reset to capture more video frames and/or still images. Steps 420–460 may be repeated to continue to capture video and still images.

It will be apparent to one of ordinary skill in the art that the method 400 is subject to many alternatives, modifications and variations without departing from the spirit and scope of this embodiment of the method 400. For example, steps 420–430 as well as steps 440–450 may be performed substantially simultaneously. These and other variations will be apparent to one of ordinary skill in the art.

What is claimed is:

1. A method for capturing video and still images, the method comprising steps of: exposing at least one sensor to incident light during an exposure window to producing an image, wherein an exposure window is the period of time between consecutive resets of the at least one sensor; generating video data from the exposed at least one sensor prior to the end of the exposure window, the video data being representative of the image, wherein generating video data includes a first reading out of pixels from the at least one sensor during a first period of time substantially prior to the end of the exposure window; and generating still image data from the exposed at least one sensor, the still image data being representative of the image, wherein generating still image data includes a second reading out of pixels from the at least one sensor during a second period of time substantially at the end of the exposure window such that the first reading out of pixels and the second reading out of pixels both occur within the same exposure window occurring between the consecutive resets of the at least one sensor.

2. The method of claim 1, wherein the step of generating video data comprises steps of:
   binning at least some of the generated pixels; and
   generating the video data using the binned pixels.

3. The method of claim 1, further comprising resetting the at least one sensor after the step of generating the still image data, such that the at least one sensor is operable to capture another image.

4. The method of claim 1, wherein the at least one sensor comprises at least one CMOS sensor.

5. The method of claim 1, wherein the step of generating video data comprises non-destructively outputting the video data prior to the end of the first predetermined period of time.

6. The method of claim 1, wherein the first period of time ranges from approximately $\frac{1}{24}^{th}$ of a second to approximately $\frac{1}{30}^{th}$ of a second, inclusive.

7. The method of claim 1, wherein the second period of time is approximately $\frac{1}{90}^{th}$ of a second.

8. An imaging system operable to substantially simultaneously capture still image data and video data, the imaging system comprising: an optical system capturing incident light producing an image; an integrated circuit including at least one sensor receiving the incident light and generating the still image data and the video data within an exposure window, wherein an exposure window is the period of time between consecutive resets of the at least one sensor, the still image data and the video data representing the image, wherein the integrated circuit is operable to generate video data by performing a first reading out of pixels from the at least one sensor substantially prior to the end of the exposure window and generates still image data by performing a second reading out of pixels from the at least one sensor substantially at the end of the exposure window, such that the first reading out of pixels and claim the second reading out of pixels both occur within the same exposure window occurring between the consecutive resets of the at least one sensor; and a controller transmitting signals to the integrated circuit for controlling the generation of the still image data and the video data.

9. The imaging system of claim 8, wherein the integrated circuit is operable to perform binning of pixels to generate the video data, the binning being performed on pixels generated from the at least one sensor being exposed to the incident light during an exposure period shorter than the exposure window.

10. The imaging system of claim 9, wherein the integrated circuit is operable to non-destructively readout pixels for the video data prior to reading out pixels for the still image data.

11. The imaging system of claim 10, wherein the at least one sensor is at least one CMOS sensor.

12. The imaging system of claim 9, wherein the exposure window ranges from approximately $\frac{1}{24}^{th}$ of a second to approximately $\frac{1}{30}^{th}$ of a second, inclusive.

13. The imaging system of claim 12, wherein the exposure time shorter than the exposure window is approximately $\frac{1}{90}^{th}$ of a second.

14. An integrated circuit operable to simultaneously generate still image data and video data, the integrated circuit comprising: at least one sensor receiving incident light during an exposure window, wherein an exposure window is the period of time between consecutive resets of the at least one sensor, and outputting a first set of pixels substantially at the end of an exposure period to generate video data, the exposure period being a period of time substantially before the end of the exposure window, and outputting a second set of pixels substantially at the end of the exposure window to generate still image data, such that the outputting of the first set of pixels and the outputting of the second set of pixels occur within the same exposure window occurring between the consecutive resets of the at least one sensor, and a controller for binning at least some of the first set of pixels, wherein the controller generates video data from the binned pixels and generates still image data from at least some of the second set of pixels.

15. The integrated circuit of claim 14, further comprising an interface for outputting the video data and the still image data.

16. The integrated circuit of claim 14, wherein the exposure window ranges from approximately $\frac{1}{24}^{th}$ of a second to approximately $\frac{1}{30}^{th}$ of a second inclusive.

17. The integrated circuit of claim 14, wherein the exposure period time is approximately $\frac{1}{90}^{th}$ of a second.

18. The integrated circuit of claim 14, wherein the at least one sensor is at least one CMOS sensor.

19. The integrated circuit of claim 14, wherein the at least one sensor performs a nondestructively readout of the first set of pixels and the second set of pixels.

20. An imaging apparatus comprising: means for exposing at least one sensor to incident light during an exposure window to produce an image, wherein the exposure window is the period of time between consecutive resets; means for generating video data from the exposed at least one sensor prior to the end of the exposure window, the video data being representative of the image, wherein generating video data includes a first reading out of pixels from at least one sensor during a first period of time substantially prior to the end of the exposure window; and means for generating still image data from the exposed at least one sensor, the still image data being representative of the image, wherein generating the still image data includes a second reading out of pixels from at least one sensor during a second period of time substantially at the end of the exposure window, such that the first reading out of pixels and the second reading out of pixels both occur within the same exposure window occurring between the consecutive resets of the at least one sensor.

21. The imaging apparatus or claim 20, wherein the means for generating the video data comprises:

means for binning at least some of the generated pixels; and means for generating the video data using the binned pixels.

22. The imaging apparatus of claim 21, wherein the means for generating still image further comprises:

means for generating the still image data from at least some of the pixels readout from the exposed at least one sensor substantially at the end of the first period of time.

23. The imaging apparatus of claim 22, further comprising means for resetting the at least one sensor after the step of generating the still image data, such that the at least one sensor is operable to capture another image.

* * * * *

UNITED STATES PATENT AND TRADEMARK OFFICE
CERTIFICATE OF CORRECTION

PATENT NO. : 7,148,919 B2  Page 1 of 1
APPLICATION NO. : 10/304960
DATED : December 12, 2006
INVENTOR(S) : James S. Voss et al.

It is certified that error appears in the above-identified patent and that said Letters Patent is hereby corrected as shown below:

In column 4, line 48, delete "I/O" and insert -- 10 --, therefor.

In column 6, line 3, in Claim 8, after "and" delete "claim".

In column 6, line 51, in Claim 17, after "period" delete "time".

In column 7, line 8, in Claim 21, delete "or" and insert -- of --, therefor.

Signed and Sealed this

Fifth Day of May, 2009

JOHN DOLL
*Acting Director of the United States Patent and Trademark Office*